(12) United States Patent
Tamsil

(10) Patent No.: US 7,082,119 B1
(45) Date of Patent: Jul. 25, 2006

(54) FULL PBX TELEPHONY FEATURE PRESERVATION ACROSS A VOICE OVER PACKET NETWORK

(75) Inventor: Yosef Rizal Tamsil, Hillsborough, CA (US)

(73) Assignee: Cisco Technology, Inc., San Jose, CA (US)

( * ) Notice: Subject to any disclaimer, the term of this patent is extended or adjusted under 35 U.S.C. 154(b) by 963 days.

(21) Appl. No.: 09/606,788

(22) Filed: Jun. 28, 2000

(51) Int. Cl.
*H04L 12/66* (2006.01)

(52) U.S. Cl. ........... 370/352; 370/389; 370/466

(58) Field of Classification Search ........ 370/352, 370/353–355, 356, 389, 392, 465, 466
See application file for complete search history.

(56) References Cited

U.S. PATENT DOCUMENTS

| | | | |
|---|---|---|---|
| 6,275,574 B1 * | 8/2001 | Oran | 379/201.01 |
| 6,353,660 B1 * | 3/2002 | Burger et al. | 379/88.1 |
| 6,363,065 B1 * | 3/2002 | Thornton et al. | 370/352 |
| 6,404,746 B1 * | 6/2002 | Cave et al. | 370/262 |
| 6,426,945 B1 * | 7/2002 | Sengodan | 370/238 |
| 6,487,196 B1 * | 11/2002 | Verthein et al. | 370/352 |
| 6,519,251 B1 * | 2/2003 | Lim | 370/352 |
| 6,539,237 B1 * | 3/2003 | Sayers et al. | 455/555 |
| 6,584,110 B1 * | 6/2003 | Mizuta et al. | 370/401 |
| 6,603,757 B1 * | 8/2003 | Locascio | 370/352 |
| 6,614,781 B1 * | 9/2003 | Elliott et al. | 370/352 |
| 6,621,814 B1 * | 9/2003 | Korpi et al. | 370/352 |
| 6,636,528 B1 * | 10/2003 | Korpi et al. | 370/467 |
| 6,724,749 B1 * | 4/2004 | Tashiro et al. | 370/352 |
| 6,819,945 B1 * | 11/2004 | Chow et al. | 455/567 |
| 2003/0091028 A1 * | 5/2003 | Chang et al. | 370/352 |

* cited by examiner

*Primary Examiner*—Steven Nguyen
*Assistant Examiner*—Roberta A. Shand
(74) *Attorney, Agent, or Firm*—Marger Johnson & McCollom, P.C.

(57) ABSTRACT

A method for providing supplementary services in a packet voice network. The method includes the steps of receiving a list of information elements from a sending station and then inserting the list into a call control message. The message is inserted in such a manner as to ensure that any supplementary services information included in the information elements is preserved. In addition locally significant messages are included in a globally significant message so any supplementary services information in the locally significant messages is preserved. After the supplementary services information is preserved, the messages are sent to a receiving station. A network device operable to provide this functionality is also discussed.

17 Claims, 2 Drawing Sheets

FULL PBX TELEPHONY FEATURE PRESERVATION ACROSS A VOICE OVER PACKET NETWORK

BACKGROUND

1. Field

This disclosure relates to voice over packet networks, more particularly to providing full PBX feature transparency across voice over packet networks.

2. Background

If users move from a traditional, public switched transmission network (PSTN) phone system to a packet voice phone system, they can obtain several advantages. Voice over packet networks typically use existing data networks, avoiding large network change over costs. Coding and packetizing voice signals and routing them across existing packet networks also saves considerable costs on long-distance charges. Using excess capacity on existing data networks also makes those networks more efficient and cost effective.

Most of these advantages result from the connections to the outside world from a company's internal phone system. One example of an internal phone system is a PBX, or private branch exchange. Changing the traditional PBX to a packet voice network may cause some features to be lost.

In the ISDN (integrated services digital network) environment, there are two classes of service, basic and supplementary. The difference between the two classes lies in their ability to stand alone. Stand-alone services are basic services. Supplementary services rely upon the presence of another service to operate. Examples of supplementary services include call waiting, call hold, completion of call to busy subscriber, call transfer, call forwarding, etc. These will also be referred to as PBX features, since they are typically associated with PBX service. A packet voice network should maintain these features to provide users with no loss of features.

When packet networks replace PBXs, however, a problem can arise with certain types of control messages. Network devices in the packet network may drop control messages occurring between two directly connected nodes, referred to as local messages. Since the messages are only locally significant, the routers do not send them to other stations on the network. A problem arises when two nodes are connected through a third node. The middle node drops the locally significant messages, which may affect the network's ability to provide supplementary services. Some supplementary services depend upon the local messages to operate.

For example, when one end node disconnects from the network such as when the user hangs up, that node sends a disconnect message on the data (D) channel to the middle node. The middle node responds with a RELEASE message to the end node before passing the disconnect to the other end node. A RELEASE message releases the B channel used by the end node to connect with the middle node and ultimately the other end node. This sequence effectively prevents any supplementary services from being passed from the one end node to the other. Because the middle node does not pass on the RELEASE message, since it is of local significance, any supplementary services information in that message does not pass either. This is also true of any supplementary service elements being carried by the RELEASE COMPLETE messages.

Therefore, a method to provide supplementary services information contained in locally significant messages to non-local nodes on the packet voice network is needed. This would allow users to continue to have all the features available on traditional PBXs, with all the advantages of a packet voice network.

SUMMARY

One aspect of the invention is a method for providing supplementary services in a packet voice network. The method includes the steps of receiving a list of information elements from a sending station and then inserting the list into a call control message. The message is inserted in such a manner as to ensure that any supplementary services information included in the information elements is preserved. In addition locally significant messages are included in a globally significant message so any supplementary services information in the locally significant messages is preserved. After the supplementary services information is preserved, the messages are sent to a receiving station. Typically, the message from within which the information elements are received will be a Q.931 message.

Another aspect of the invention is a network device operable to include supplementary services information normally transmitted in a PBX in voice over packet network transmissions. One embodiment of the network device has two communication devices, with a transit node between them. The messages are transferred through the transit node such that the locally significant messages are preserved, as well as Q.931 information elements translated into call control messages for a packet voice network.

BRIEF DESCRIPTION OF THE DRAWINGS

The invention may be best understood by reading the disclosure with reference to the drawings, wherein.

DETAILED DESCRIPTION OF THE EMBODIMENTS

Integrated services digital network (ISDN) provides digital telephone service to users. ISDN interfaces are time division multiplexed into channels. Control and data signals are separated into different channels. Data, or D, channels handle control signals and bi-directional, or B, channels handle data. The data may include voice signals, data signals and video signals. The B channels have 64,000 bits per second (kbps) bandwidth.

Two primary variants of ISDN are basic rate interface (BRI) and primary rate interface (PRI). BRI provides two B channels and one D channel and is often referred to as 2B+D. PRI service typically runs over a T1 or E1 line. PRI over a T1 line offers 23B+D service. The D channel for PRI has 64 kbps and for BRI has 16 kbps bandwidth.

A number of international standards define ISDN. The International Telecommunications Union (ITU) provides most of them. I.430 describes the Physical layer and part of the Data Link layer for BRI. Q.921 documents the Data Link protocol used over the D channel. Q.931 documents the Network layer user-to-network interface and is of the most interest here. Q.931 provides call setup and breakdown, channel allocation, and a variety of optional services. One set of these optional services is referred to as supplementary services.

As mentioned previously, supplementary services are those services that depend upon the presence of another service to be available. Basic services are those that stand alone. Supplementary services include features typically offered to users within businesses, such as call forwarding, call hold, call transfer, etc.

The tasks accomplished using the Q.931 standard, such as call setup and breakdown, are completed on the data channel using messages formatted in accordance with the standard. These messages are referred to as call control messages. Q.931 was promulgated as an ISDN-specific standard. However, voice over packet networks use variants of Q.931 messaging. Because of this, the same message names are typically used. Therefore, for example, a DISCONNECT message in VoX networks will perform analogous to the DISCONNECT message provided in the Q.931 specification. There are some variations, as will be discussed further.

Currently, three types of packet networks are used to transmit voice data. Voice over Internet Protocol (VoIP) devices transmit voice data in packets across networks using the Internet Protocol. Voice over Asynchronous Transfer Mode (VoATM) transmits voice data as cells across an ATM network. Finally, Voice over Frame Relay (VoFR) transmits voice data in frames across a Frame Relay network. The terms packets, frames, and cells, as well as other groups of data, will be referred to generally as packets. The networks will be referred to as VoX networks, where X represents ATM, IP, FR, as well as any other network that can carry voice data in packet form.

Figure 1:
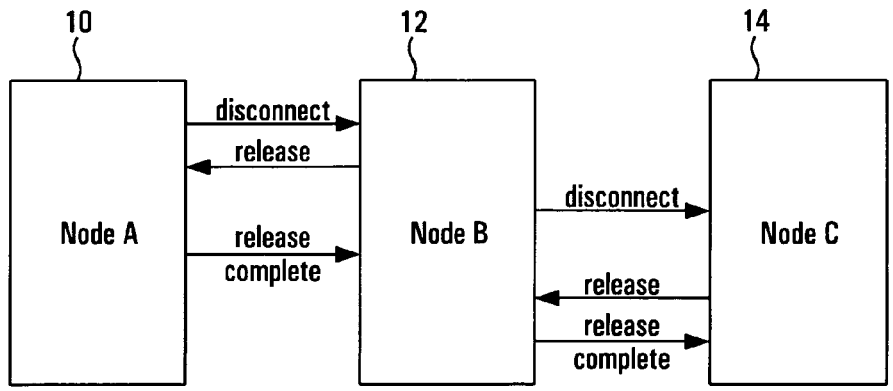
FIG. 1 shows a prior art network block diagram and call disconnection sequence.

The commonality of call control used by these different networks and ISDN offers some advantages in correcting some problems that may occur in replacing a PBX with a VoX network. One such problem is shown in FIG. 1, a block diagram representation of a VoX network which may cause a loss of features that were previously available through the PBX. The messages transmitted between nodes are sequenced by time on FIG. 1, with the initial message at the top of the figure and the final message at the bottom.

Node A 10 is the sending node and node C 14 is the receiving node. They are connected through node B 12. During the course of a call, the user at node A hangs up the phone. Node A responds by sending DISCONNECT message to node B. Node B generates an immediate response RELEASE to node A before passing the DISCONNECT message to node C. RELEASE and RELEASE COMPLETE messages are only of local significance. They are only considered significant to two nodes connected directly together. Therefore, when node B receives the DISCONNECT message to which it is to respond, node B sends the RELEASE message prior to passing the DISCONNECT to node C.

Node A and node B continue with the call releasing routine regardless of what is happening between node B and node C. Node A returns a RELEASE COMPLETE message to node B, releasing the channel. Node B then continues with the call release messages with node C. The problem arises because there may be supplemental services information contained in the RELEASE and RELEASE COMPLETE messages that does not get transferred from A to C or C to A. Nodes A and C are not directly connected, so they do not receive any information contained in locally significant messages from each other. The numbers of the messages shows the sequence of the messages, 1 through 12.

An example of this problem occurs using Ericsson QSIG. Q identifies an endpoint of an ISDN connection and SIG means signaling, so QSIG is a signaling protocol for ISDN endpoints. It is typically used in networks of PBXs. Ericsson QSIG relies upon user-to-user (UU) information elements sent in RELEASE messages to be passed between the involved PBXs for some supplementary services to work correctly. For example, call forward across a VoX fails to work on some versions because the network devices of the VoX do not pass the UU information elements in the RELEASE message back to the originating PBX.

Figure 2:
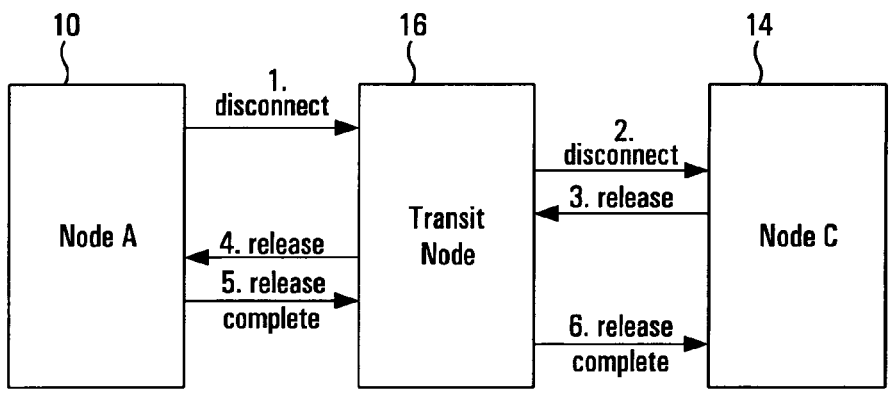
FIG. 2 shows one embodiment of a network block diagram and call disconnection sequence in accordance with the invention.

One embodiment of a solution to this problem is shown in FIG. 2. A transit node 16 replaces node B 12 of FIG. 1. In general terms, node B from FIG. 1 is also a transit node, as that term typically applies to any intermediate node in a VoX network. However, transit node as used here will apply to a node that passes locally significant messages end to end rather than restricting them to directly connected nodes.

As will be discussed further, transit node B has a combination of devices rather than being just a solitary device or bridge as shown in FIG. 1. This combination of devices allows the network device of the transit node in FIG. 2 to function more effectively in preserving supplementary services.

Following the example used previously, the user at node A 10 hangs up the phone during a VoX call. This generates a DISCONNECT message to the transit node 16. The transit node 16 then performs some internal handling and passes the DISCONNECT message to the receiving node C. Node C generates a RELEASE message that is passed back to the transit node. The transit node again performs some internal message handling and passes the RELEASE message back to node A. Node A responds with RELEASE COMPLETE and the transit node passes this back to node C. The messages are again numbered by their sequence. In this manner, any supplementary services information is passed end to end, rather than being stopped at the intermediate node.

An example of a network device that can function in the manner described above as a transit node is shown in FIG. 3. The transit node 16 comprises a network device, in this example. The network device has two communication devices 18 and 22 and a tandem node 20. The tandem node 20 is optional. In some environments and depending upon the functionality of the communication devices, the tandem node will not be necessary. The communication devices could be of several different types, including routers.

Figure 3:
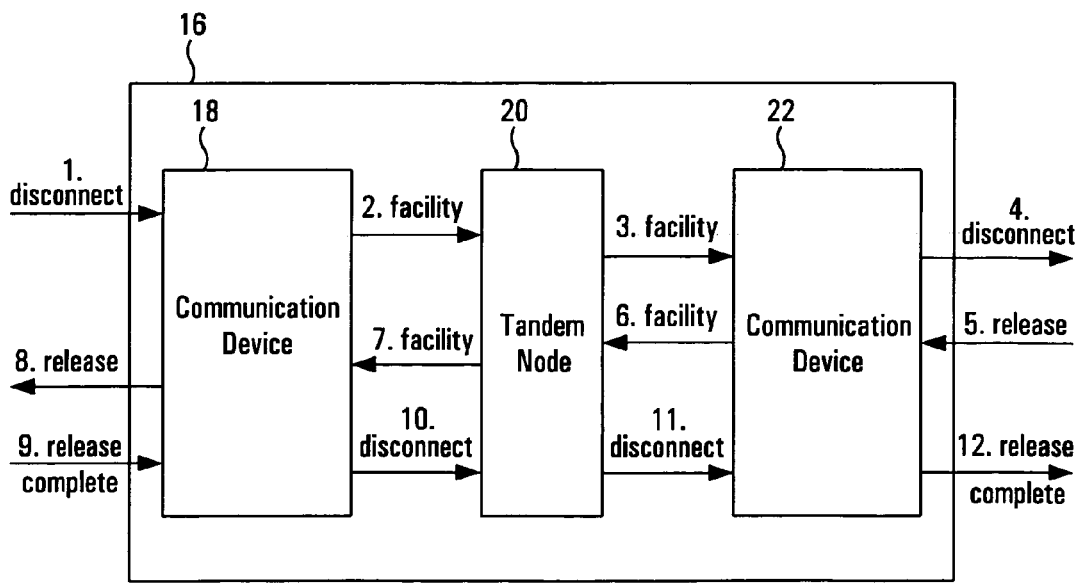
FIG. 3 shows one embodiment of a network device allowing transfer of supplementary services, in accordance with the invention.

As can be seen by FIG. 3, the internal messaging of the transit node 16 involves a mapping or insertion of information from the Q.931 messages into other types of Q.931 messages. The network device communicates with node A from FIGS. 1 and 2 through communication device 18 and with node C through communication device 22. When the DISCONNECT message is received from node A, communication device 18 maps or otherwise inserts the supplementary services information into a FACILITY message. The tandem node 20 then passes the FACILITY message to the communications device 22. Communication device 22 then interprets the header on the FACILITY message, converts it to a DISCONNECT message and sends it to the other end node.

It should be noted that the DISCONNECT message must be mapped to a FACILITY message in some environments, or the supplementary services information will not be transferred. For example, in H.225 compliant systems, there is only a single call teardown message. When the initial disconnection or teardown message is sent, it is assumed to be the last communication between the two legs of the call. In this case, none of the subsequent messages would be transmitted and no supplementary services information will be sent. The mapping of the DISCONNECT messages to the FACILITY message postpones the actual teardown of the call legs, until the RELEASE COMPLETE message is received and ending transfer of the supplementary services information.

The other end node returns with a RELEASE message that includes supplementary services information. The RELEASE message is then mapped or otherwise inserted into a FACILITY message, which traverses the tandem node in the opposite direction. Communication device 18 converts it to the locally significant RELEASE message. When communication device receives the RELEASE COMPLETE message from the originating node, it maps or otherwise inserts the supplementary services information and the message into a DISCONNECT message, which traverses the tandem node. Finally, communication device 22 converts the information in the DISCONNECT message back to the locally significant RELEASE COMPLETE message to be communicated to the receiving node.

This network device may not be a new hardware device. Instead it may be implemented as a software upgrade to the existing network devices. Additionally, while the block diagram shows that the communication devices are separate devices, this is only used for better explanation of the invention. The communication devices may actually be contained in one network device such as a router or bridge. The software upgrade would be distributed through some type of computer readable medium, such as a downloadable file installed into the network device via a network or loaded from a directly connected computing device. In either case, a computing device would be responsible for reading the medium to install the software. This software will have the functionality discussed above, the inclusion of locally significant messages in global significant message formats for transferring supplementary services information from one end to the other.

The mapping or insertion of the supplementary services information may have two parts. One part is that discussed above, where a locally significant message is mapped into a globally significant message. The other part is preservation of Q.931 supplementary services information in general, as VoX networks use their own call control protocols that are analogous to Q.931. As mentioned previously, Q.931 formats and functions have analogies in VoX networks, but some function is slightly different ways. However, all VoX networks have information elements as part of the message payload.

Therefore, one part of preserving supplementary services information involves inserting or including all the Q.931 information elements sent through the VoX network. Rather than a complex mapping of Q.931 information elements to the respective VoX call control protocol, the encapsulated list of information elements is simply appended to the tail of the equivalent VoFR or VoATM call control message. Alternatively, it could be mapped or otherwise inserted into a USER INFORMATION element of the H.225 call control used in VoIP. This solution has the advantage of passing the information elements end to end without any interpretation. This also has the advantage of not violating VoIP H.225 standards, nor those of VoFR or VoATM.

The standard Q.931 message format is shown below.

| Protocol Descriptor | Length of CR | Call Reference (CR) | Type | Information Elements |
|---|---|---|---|---|
| 1 byte | 2 bytes | 3 – n bytes | n + 1 bytes | |

Messages with this format are encapsulated by removing the protocol descriptor, call reference length, call reference and message type. These fields are either of local significance or can be obtained from the context of the call control software in the network device.

The encapsulation format of the list of information elements is illustrated in the diagram below.

| Field Protocol ID | Length | List of Information Elements | TSP Header |
|---|---|---|---|
| 4 bytes | 2 bytes | Max of 8*260 bytes | 1 byte |

The field protocol ID is used to identify the Q.931 aspects of the element encapsulated so that any interested network device can analyze and dissect information contained in the elements while being aware of the context of the protocol aspects to which the elements belong. The protocol id most significant byte is used to indicate the version of the encapsulation format. Call control software versions on the network devices can correlate with the encapsulation version. The length field indicates the size of the list of elements in bytes. The list of information elements is the actual body of the Q.931 message. The TSP (telephony service provider) header is used by the call control software in the network device to reflect the mapping of locally significant messages to globally significant messages as described above.

Figure 4:
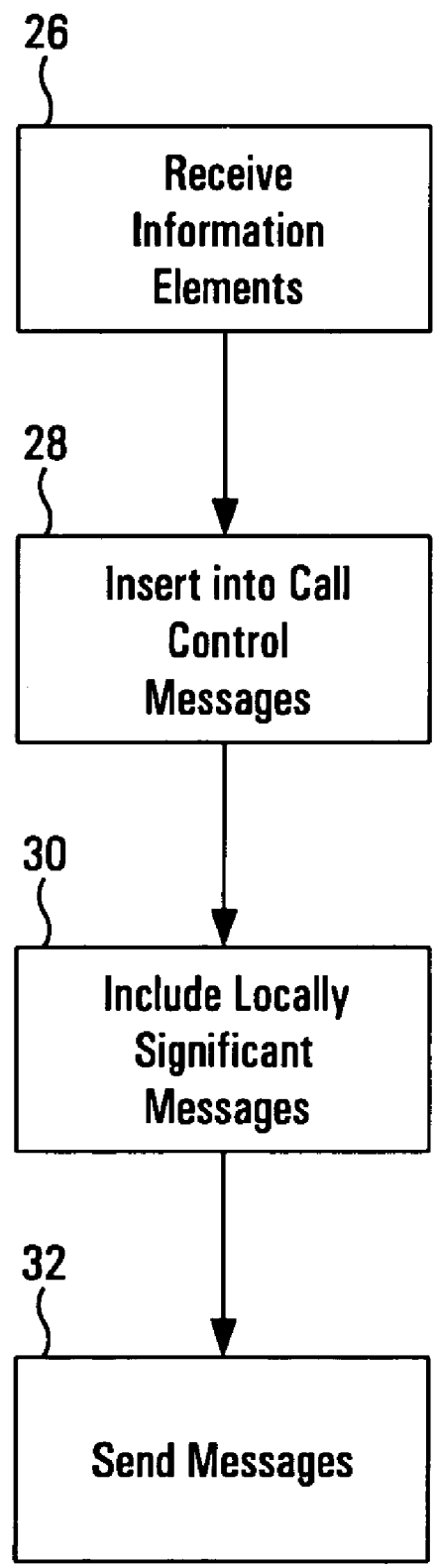
FIG. 4 shows a flowchart of one embodiment of preserving supplementary services information, in accordance with the invention.

In this manner, the two mechanisms discussed above serve to preserve supplementary services information when a phone system converts from a PBX to a VoX network. The supplementary services information are preserved by application of the invention. One embodiment of a method for performing such preservation is shown in FIG. 4.

A network device, such as that shown in FIG. 3, receives the information elements typically through a Q.931 message at 26. The information elements from the Q.931 are then inserted into the analogous call control message for the VoX network at 28. If the Q.931 message is a locally significant message, it is included by inserting or including it as a globally significant message at 30. These processes serve to preserve the supplemental services information typically available through PBXs. In this manner features available prior to changing from a PBX system to a VoX system remain available to the users. These messages are then sent at 32.

The specific examples given above indicate that only the locally significant messages of RELEASE and RELEASE COMPLETE are mapped into the globally significant messages of DISCONNECT and FACILITY. However, these were not intended to limit application of the invention. Any locally significant message could be mapped to any globally significant message. In this manner, locally significant messages are passed transparently end to end without violating any VoX constrictions, such as H.225 messages in an IP network.

Further, while this invention is envisioned to be applied to an ISDN network using Q.931 call control messaging from the end nodes, it may be applied to any network running standardized call control messages with a separate call control channel. ISDN networks will more than likely continue to use Q.931 standardized messages, but application of this invention is not restricted to this particular call control message.

Thus, although there has been described to this point a particular embodiment for a method and apparatus for full PBX feature preservation in VoX networks, it is not intended that such specific references be considered as limitations upon the scope of this invention except in-so-far as set forth in the following claims.

What is claimed is:

1. A method for providing supplementary services in a packet voice network, the method comprising:
   receiving a list of information elements from a sending station in a private branch exchange network;
   inserting the list into a call control message such that any supplementary services information included in the information elements is preserved, wherein supplementary services are services that rely upon the presence of another service to operate;
   mapping a locally significant message into a globally significant message in a private branch exchange network wherein any supplementary services information in the locally significant messages is preserved, wherein a locally significant message is a message that is otherwise not transmitted to other stations on a network; and
   sending the call control message and the globally significant message to a receiving station in the private branch exchange network.

2. The method of claim 1 wherein the list of information elements are received as a Q.931 message.

3. The method of claim 1 wherein the inserting the list further comprises appending the information elements to a call control message for a voice over packet network.

4. The method of claim 1 wherein the inserting the list further comprises mapping the information elements into the user information element of an H.225 message.

5. The method of claim 1 wherein the packet voice network further comprises one of the group comprising: Voice over FR, Voice over IP and Voice over ATM.

6. The method of claim 1 wherein the locally significant message further comprises a RELEASE message.

7. The method of claim 1 wherein the locally significant message further comprises a RELEASE COMPLETE message.

8. The method of claim 1 wherein the globally significant message further comprises a DISCONNECT message.

9. The method of claim 1 wherein the globally significant message further comprises a FACILITY message.

10. A network device for providing supplementary services in a packet voice network, comprising:
    a first communication device operable to communicate with a sending node;
    a second communication device operable to communicate with a receiving node; and
    a tandem node operable to transfer supplementary services information from the first communication device to the second communication device such that the supplementary services information is transferred to the receiving node after the sending node sends a disconnect message thereby providing private branch exchange services, wherein the supplementary services information is acquired from a locally significant message not otherwise transmitted past the first communication device and mapped into a globally significant message.

11. The device of claim 10, wherein the first and second communication devices further comprise routers.

12. The device of claim 10, wherein the first and second communication devices are part of one router.

13. A computer readable medium containing software code, said code including:
    code operable to receiving supplementary services information from a sending station in a private branch exchange network, wherein supplementary services are services that rely upon the presence of another service to operate;
    code operable to insert the supplementary services information into a call control message;
    code operable to map a locally significant message into a globally significant message, wherein a locally significant message is a message that is otherwise not transmitted to other stations on the network; and
    code operable to send the call control message and the globally significant message to a receiving station in a private branch exchange network.

14. The computer readable medium of claim 13, wherein the software code is a downloadable file distributed across a network.

15. The computer readable medium of claim 13, wherein the software code is a computer file transferred from a directly connected computing device.

16. A network device operable to provide supplementary services information, comprising:
    a first means for communicating with a sending node;
    a second means for communication with a receiving node; and
    means for mapping a locally significant message to a globally significant message from the first means to the second means such that private branch exchange services are transferred, wherein the locally significant message is a message not otherwise transmitted past the first means.

17. A network device operable to provide supplementary services information, comprising:
    a first communication device operable to communicate with a sending node;
    a second communication device operable to communication with a receiving node; and
    the first communication device is operable to map supplementary to services information from a locally significant message otherwise not transmitted base the first communication device directly to the second communication device into a globally significant message such that the supplementary services information is transferred to the receiving node after the sending node sends a disconnect message thereby providing private branch exchange services.

* * * * *